Sept. 12, 1939.  R. E. J. NORDQUIST  2,172,402
CAN TREATING MACHINE AND FEED CONTROL THEREFOR
Filed June 12, 1935  7 Sheets-Sheet 1

Fig. 1

INVENTOR
Ronald E. J. Nordquist
BY
ATTORNEYS

Sept. 12, 1939.  R. E. J. NORDQUIST  2,172,402
CAN TREATING MACHINE AND FEED CONTROL THEREFOR
Filed June 12, 1935   7 Sheets-Sheet 2

INVENTOR
Ronald E. J. Nordquist
BY Ivan U. Thornburgh
Charles H. Cope
ATTORNEYS

Sept. 12, 1939. R. E. J. NORDQUIST 2,172,402
CAN TREATING MACHINE AND FEED CONTROL THEREFOR
Filed June 12, 1935 7 Sheets-Sheet 5

INVENTOR
Ronald E. J. Nordquist
BY
ATTORNEYS

Sept. 12, 1939. R. E. J. NORDQUIST 2,172,402
CAN TREATING MACHINE AND FEED CONTROL THEREFOR
Filed June 12, 1935 7 Sheets-Sheet 6

INVENTOR
Ronald E. J. Nordquist
BY
ATTORNEYS

Sept. 12, 1939.   R. E. J. NORDQUIST   2,172,402
CAN TREATING MACHINE AND FEED CONTROL THEREFOR
Filed June 12, 1935   7 Sheets-Sheet 7

Fig. 19

INVENTOR
Ronald E. J. Nordquist
BY Ivan O. Thornburgh
Charles H. Cline
ATTORNEYS Patented Sept. 12, 1939

2,172,402

UNITED STATES PATENT OFFICE 2,172,402

CAN TREATING MACHINE AND FEED CONTROL THEREFOR

Ronald E. J. Nordquist, Maplewood, N. J., assignor to American Can Company, New York, N. Y., a corporation of New Jersey Application June 12, 1935, Serial No. 26,275

19 Claims. (Cl. 113—1)

The present invention relates to can treating machines and to the feed control of filled cans and can covers for such machines and has particular reference to devices for detecting improperly and insufficiently filled cans and for diverting the cans not properly filled from the machine and without covers, the feeding of covers under such circumstances being arrested.

An object of the invention is the provision of a can and cover feed control for a filled can treating machine wherein cans are tested for fill and when the test shows that the cans are improperly filled they are ejected from the machine without receiving can covers.

Another object is the provision of such a control mechanism which governs the feeding of covers to the cans in accordance with the level of the contents in the cans and which withholds covers from insufficiently filled cans.

Another object is the provision of such a control mechanism wherein the failure to feed a cover to a can, properly filled or otherwise, automatically diverts the can from the machine.

Still another object is the provision of can fill detecting devices associated with such a control for cans filled with liquids which have a tendency to foam when agitated wherein cans containing less than a predetermined quantity of liquid irrespective of the foam therein are removed.

A further object is the provision of a control of the character described which functions in connection with cans passing through the machine in a continuous procession, the control operating electrically, when an improperly filled can is detected, to eject such a can without interrupting the operation of the machine or the passage of other cans therethrough.

Numerous other objects and advantages of the invention will be apparent as it is better understood from the following description, which, taken in connection with the accompanying drawings, discloses a preferred embodiment thereof.

Referring to the drawings.

In the filling of cans or containers with beer or other liquids which may be said to have foaming tendencies when agitated as during filling, it is very difficult if not impossible by ordinary filling methods to accurately test for fill by reason of the presence of the foam. The apparatus of the present invention is well adapted to accurately testing for fill of a liquid irrespective of the presence of foam and therefore the preferred embodiment of the invention as disclosed in the drawings is designed for testing the fill of beer in cans and to supplying the cans which contain the desired quantity of liquid with can covers by means of which they may be closed or sealed.

A filling machine, designated generally by the letter A (Fig. 1) delivers cans, indicated by the letter a, of beer or other liquid, into a double seamer or other can sealing machine, marked on the drawings by the letter B. In their passage from one machine to the other, the filled cans are subjected to the operation of a can-fill testing or detecting device, desiganted broadly by C. This device C includes a pair of spaced electrodes or detecting elements which are dipped into a can to a predetermined depth to ascertain if the can is sufficiently and properly filled.

The electrodes are a part of an electric control system. When liquid at the proper fill level electrically closes the gap between the spaced electrodes, a can cover b is released from a magazine. Foam does not electrically close the circuit and therefore a can cover is fed only at such time that there is a properly filled can to receive it.

This released cover is carried from the feed device to a position directly above the moving can. The can and cover are then carried forward together in this alignment to the closing apparatus or other place of deposit as may be desired.

When cans are improperly filled, such as when they contain insufficient liquid or when the liquid has materially foamed up during filling with a resulting low liquid level, the cans are detected by the testing devices and are automatically thrown out or diverted from the machine without covers by a discharge device E.

For efficient and smooth operation of the apparatus the electric control circuits are arranged to maintain the system energized while the testing electrodes are out of the cans and as long as properly filled cans are continuously passing the testing devices. It is only when an improperly filled can is detected and a failure of electric energy in the power line occurs that the circuits are deenergized to throw out a can. In the case of a failure of current the cans would not be tested at all. However, this current failure will prevent the operation of the cover feeding device and the untested cans will not receive covers. Thus they would be diverted from the machine.

The preferred form of the invention comprises in part a stationary table 21 (Fig. 1) which receives the cans a from moving can supports 22 which are associated with the can filling machine A and which continually move past the table. The transfer is effected by a curved guide rail 23 one end of which is disposed across the path of travel of the moving cans while on the supports. This rail is secured to the top of the table.

The table 21 is preferably a part of the double seamer or can closing machine B and is supported on a main frame 24. In a double seamer cans are spaced further apart than the spacing utilized in the usual multiple head filling machine and accordingly spacing fingers 25 are provided for this spacing. These fingers are moved by any suitable means around a stationary timing cam 26.

The fingers 25 engage behind the cans as they are received and convey them in a circular path of travel across the table 21 between the curved guide rail 23 and a cooperative inverted cup shaped shell 28 having a can guiding edge 29. This shell is disposed over the top of the cam 26 and is secured to the top thereof.

Can testing device

The cans while moving across the table 21 are tested by the testing or detecting device C and it is then ascertained whether or not they are properly filled. This testing device is carried in a hollow arm 31 (Figs. 1, 2, 3 and 4) having a removable top cover plate 32. One end of the arm is formed with a bearing 33 which carries an internal bushing 34. The bushing is mounted on one end of a shouldered pivot shaft 35 having a head 36 which engages against one end of the bearing.

The opposite end of the shaft is engaged in a boss 37 of a bracket 38 and is held against turning by a cap screw 39 which is threaded into the end of the shaft. The bracket is bolted to the top of the guide shell 28.

The free or opposite end of the arm 31 is formed with an enlarged hollow head 45 (see also Fig. 4) which carries a pair of depending spaced electrodes 46. These electrodes are carried in shouldered insulating thimbles 47 which are located in inverted countersunk bores 48 formed in the botttom wall of the hollow head. The electrodes and the thimbles are held in place as a unit by nuts 49 which are threadedly connected to each of the electrodes and are disposed inside the head.

The electrodes 46 depend from the bottom of the head 45 above the path of travel of the cans and are moved down into each can as it passes therebeneath. This is effected by a pivotal movement of the arm 31 on the shaft 35. The bearing 33 is formed with a depending lever arm 53 (Fig. 2) which is connected to one end of a link 54. The other end of the link is connected to a leg 55 (Fig. 1) of a bell crank 56 which is mounted on a stud 57. The stud is carried in a boss 58 formed in the main frame 24.

The other leg of the bell crank 56, indicated by the character 62, carries a cam roller 63 which operates in a cam groove 64 of a cam 65. The cam is keyed to a cam drive shaft 66 which is carried in a suitable bearing 67 formed in the side of the main frame 24. This drive shaft is rotated continuously by any suitable means in proper time to rock the arm 31 and dip the electrodes 46 into each can as it passes.

The electrodes 46 are a physical part of one of the electric circuits hereinbefore briefly mentioned and which will be fully explained in connection with a description of the wiring diagram illustrated in Fig. 19. It is sufficient at this time to merely locate the wires in the testing device.

One of the electrodes 46 (Fig. 3) is connected to the end of a lead wire 71 and the other is connected to the end of a wire 72, both wires being disposed in the hollow arm 31. The wires pass through openings 73, 74 formed in the bushing 34 and shaft 35, respectively, the latter opening connecting with a longitudinal bore 75 formed centrally of the shaft and through which the wires extend.

At the bracket end of the shaft the bore 75 communicates with an opening 76 in the shaft and an opening 77 in the boss 37. This latter opening is enlarged to receive the end of a conduit pipe 78 through which the wires extend. Thus the arm 31 may be rocked about its pivot shaft 35 without disturbing the electric connections to the electrodes 46.

The can after passing the testing device continues its travel across the table 21 where it meets a can pocket 81 (Figs. 1 and 12) of a turret 82. The turret is mounted on a stationary central column 83 formed as a part of the main frame 24. The turret is continuously rotated in proper time by any suitable means.

Cover feed device

In accordance with the results of the test by the device C, if the can is properly filled, a cover b is released by the cover feed device D. This cover is placed into the pocket of and is carried by the turret 82 and it is in the turret pocket that it meets the can.

A supply of covers b is arranged in stack formation within a magazine which comprises a plurality of vertical rods 91 (Figs. 1, 5, 7, 8, 9 and 10). Two of these rods are threaded into a main bracket 92 formed with a half mould hub 93 which engages the central column 83 of the machine. This hub is bolted to a similar half mould hub 94 which fits the other side of the column and is a part of an auxiliary bracket 95. Thus both main and auxiliary brackets are supported on the column.

A third magazine rod 91 is threadedly secured in the top of a cross strap 96 (Fig. 10) which is held in place by bolts 97 on the top of a cover feed frame 98. This frame is mounted on the bracket 92 and is held in fixed position by the bolts 97 each of which extends through upper and lower frame bosses 99, the lower end of each bolt being threaded into the bracket.

A short stud 101 (Figs. 8 and 10) is secured in the bottom of the cross strap 96 and extends down in vertical alignment with and forms a lower extension of one of the magazine rods.

The lowermost cover in the stack is supported at its rear on a horizontally projecting ledge 111 (Figs. 8, 9 and 10) of a vertically movable slide 112 which moves in a T-shaped groove 113 formed in the front lower end of the cover feed frame 98. This end of the frame extends down into an opening 114 formed in the bracket 92, the opening being so shaped as to also accommodate the lower covers in the stack. The cover stack is directly above the path of the turret pockets 81.

At times, as will be explained hereinafter, the slide 112 is moved down to deliver the lowermost cover into a passing turret pocket 81. This movement is effected by a cam 116 having a groove 117 in which operates a cam roller 118. The roller is mounted on a pin 119 which is carried in the upper end of the slide 112.

The cam 116 is keyed to a short vertical cover feed cam shaft 122 which at its lower end is journaled in a bearing 123 formed in the lower end of the cover feed frame 98. At its upper end the shaft passes through a bushing 124 which is journaled in a bearing 125 formed in the upper section of the cover feed frame. A nut 126 threaded on the top end of the shaft holds it and its bushing in the bearings.

Shaft 122 is continuously rotated by a pinion 127 secured to its lower end below the bearing 123. This pinion is driven by a gear 128 which is mounted on top of the turret 82 and is rotated with it.

Figures 6, 7:
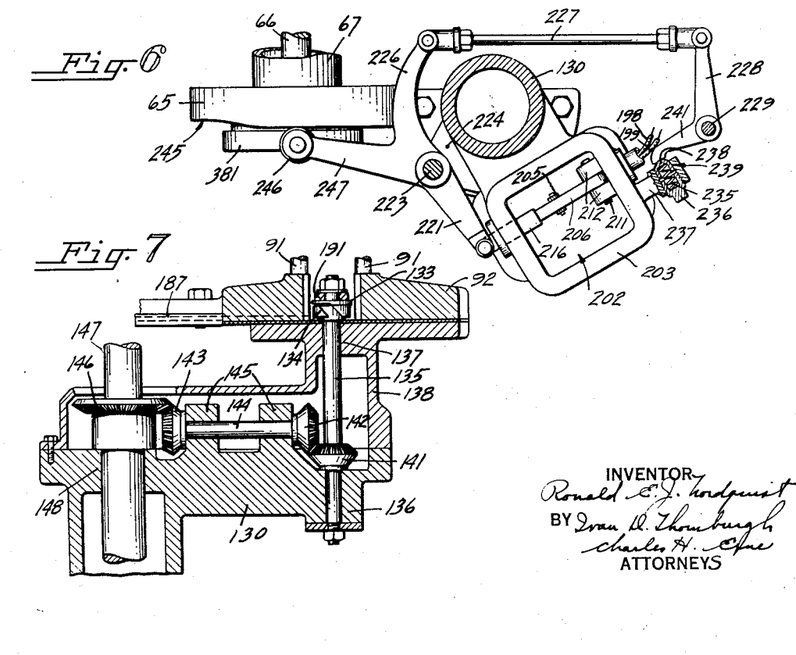
Fig. 6 is a horizontal section taken substantially along the broken line 6—6 in Fig. 5.
Figs. 7 and 8 are enlarged fragmentary sectional views taken substantially along the respective lines 7—7, 8—8 in Fig. 1.
Figure 8:
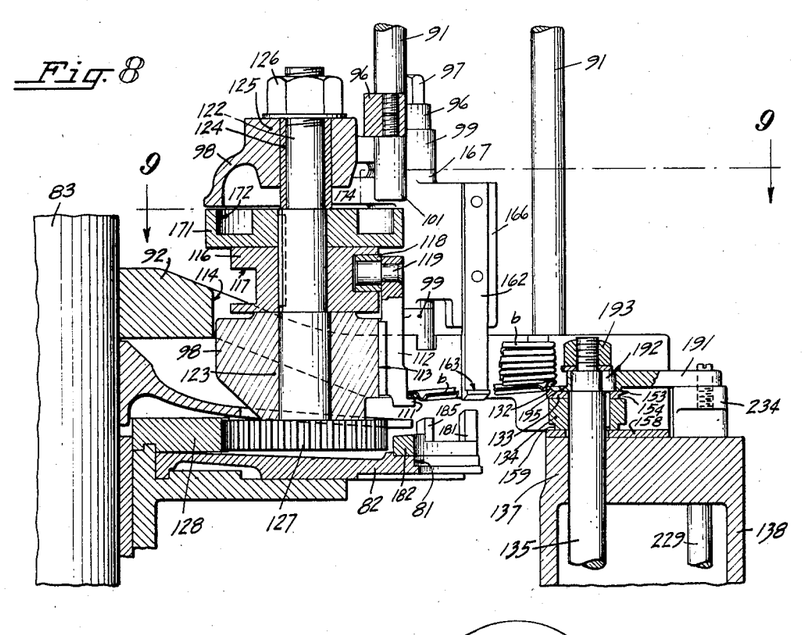

In front the lowermost cover b in the magazine is supported in part on an upper rim 132 (see also Fig. 11) of a cup shaped cover separator disc 133. The separator disc is carried on the top of a separator body 134 and both of these are keyed to a vertical shaft 135 (Figs. 7 and 8). This shaft is journaled in a lower bearing 136 formed in a casing 130 bolted to the main frame 24 and in an upper bearing 137 formed in a cover plate 138 bolted on top of the casing.

The shaft 135 is continuously rotated through a gear connection comprising a bevel gear 141 mounted on the shaft, bevel gears 142, 143 mounted on the ends of a horizontal shaft 144 carried in casing bearings 145 and a bevel gear 146 mounted on a drive shaft 147 carried in a bearing 148, this bearing being also formed in the casing 130. The drive shaft 147 is driven in any suitable manner in time with the other moving parts of the machine.

Figure 11:
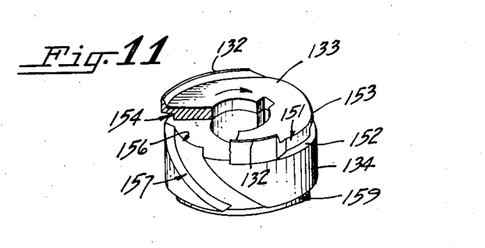
Fig. 11 is an enlarged perspective view of separator parts of the cover feed device.

Rotation of the separator disc 133 in the direction as indicated by the arrow in Fig. 11 causes the rim 132 to move out from under the stack of covers and unless the stack is otherwise held, as will be later explained, the forward side of the entire stack of covers drops down. When this takes place the bottom cover passes into a recess 151 cut in the outer edge of the separator disc. This lowermost cover moves down onto the top of the separator body 134 and onto a ledge 152.

Continued rotation of the separator disc 133 brings a laterally projecting knife edge 153, formed on the outer edge of the disc, in between the lowermost cover and the cover next above and cuts out or separates the former from the stack. Following this the rim 132 of the disc moves under the stack and the remaining covers are then supported on the rim. During this separating operation the bottom or cut-out cover remains on the ledge 152, a clearance groove 154 being provided for this purpose in the edge of the disc under the knife edge 153 below the supporting rim 132.

Figures 12, 13:
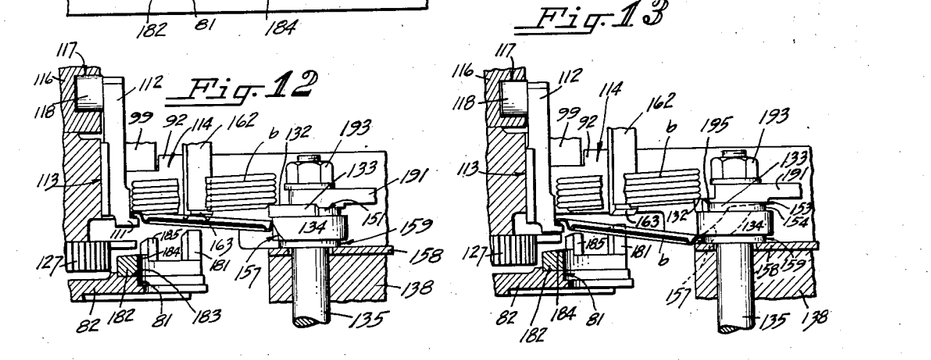
Figs. 12 and 13 are fragmentary partial sectional views taken substantially along the line 12—12 in Fig. 9 and illustrating different positions of the parts involved.

A part of the ledge 152 is cut away in a recess as at 156 (Fig. 11) and this leads into a spiral groove 157 formed in the separator body 134. As separator disc and body further rotate the front edge of the separated cover drops into the recess 156 and is then tilted down into and is guided by the groove 157. In this tilting action the cover moves from the position of Fig. 12 to the bottom of the groove (Fig. 13). In the last position the front side of the cover rests on top of a plate 158 which is secured on top of the cover plate 138.

The separated cover is momentarily held in this inclined position of Fig. 13 with its rear edge still resting on the ledge 111. Its forward edge is now in an annnular clearance groove 159 formed by cutting away the lower edge of the separator body 134.

During this dwell of the released cover, a pair of diametrically disposed stack supporting side fingers 162 (Figs. 8, 9, 10, 12 and 13) move in toward the stack. These fingers have projecting bottom ledges 163 which pass under the outer edge on both sides of the bottom cover remaining in the stack. The fingers 162 extend down into clearance recesses 164, 165 (Fig. 9) formed in the bracket 92 adjacent to and merging into the stack opening 114.

At their upper ends the fingers are carried by and are bolted to the forward ends of a pair of wings 166 (Figs. 9 and 10), one of which is disposed on each side of the cover magazine. Each wing is formed with a vertical hub 167 which is mounted on a cover feed bracket bolt 97 in between the spaced bosses 99 of the bracket.

Figure 9:
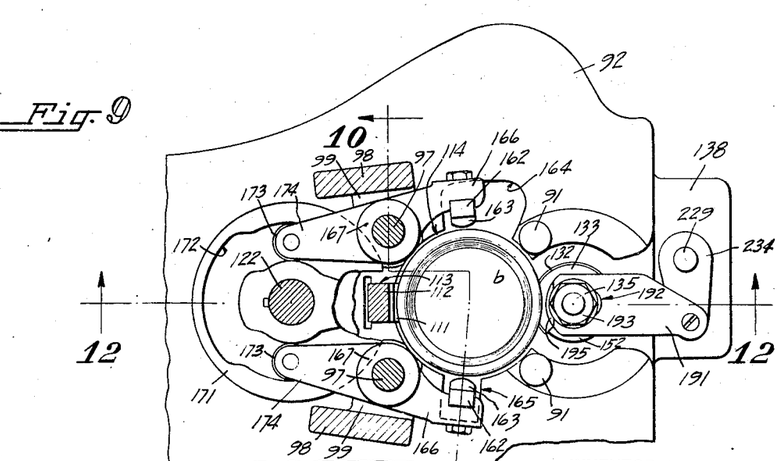
Fig. 9 is a horizontal section taken substantially along the broken line 9—9 in Fig. 8, parts broken away.
Figure 10:
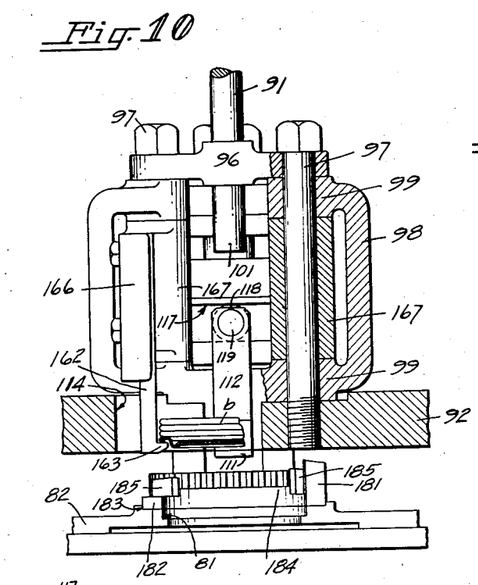
Fig. 10 is a vertical section taken substantially along the broken line 10—10 in Fig. 9.

The wings 166 rock on the bolts 97 as pivots, at the proper time, being moved by a cam 171 (Figs. 8 and 9). The cam is provided with a groove 172 in which operates a roller 173 carried on the end of an arm 174 formed on its associated wing hub 167. This cam is mounted on the cover feed drive shaft 122 just above the slide cam 116, and turns with the shaft.

As the fingers 162 move into position with their ledges 163 under the stack of covers, the slide cam 116 moves the slide 112 down so as to lower the rear edge of the partially cut-out cover (Fig. 13). This action completely separates the cut-out cover from the bottom cover remaining in the stack, leaving the stack supported on the two finger ledges 163 and on the separator disc rim 132.

The separated cover is now in the path of travel of a cover engaging lug 181 (Figs. 8, 10, 12, 13 and 17) carried by the turret 82. The lug extends up from the top of a semi-cylindrical or half ring 182, seated in a recess 183 formed in the turret adjacent the inner edge of each of the can pockets 81.

With the rotation of the turret 82, the lug 181 engages the separated cover sweeping it off its supporting finger ledge 111 and plate 158. The rear edge of the cover drops down onto a raised wall 184 of the ring 182, the cover being thus supported directly over the top of the can pocket 81. The cover is held in this position by the lug 181 and a pair of holding lugs 185 disposed at opposite ends of the raised wall and projecting up from the top of the ring.

The forward edge of the cover when moved off the plate 158 passes into and is supported by the walls of a groove 186 formed in the inner edge of the cover guide rail 187. This rail is bolted to the bottom of the bracket 92. While thus supported the cover is carried forward by the turret to the point where the pocket containing the cover is presented to meet its properly filled can. The timing between rotation of the turret and travel of the can moving fingers 25 is so synchronized that the cover will meet the same properly filled can that has been responsible for its release from the stack. This will be further explained.

If a can when tested is found to be improperly filled no cover is released for that can. The stack of covers in addition to being held in the magazine by the disc rim 132 as already described is also affected by a slide finger 191 (Figs. 8 and 9) by means of which a feeding action takes place or by means of which such action is prevented.

One end of the slide finger 191 rests on top of the cover separator disc 133. This end is formed with a slot 192 through which extends the upper end, reduced in diameter, of the shaft 135. The finger is loosely held by a washer and nut 193 the latter being threadedly engaged on the shaft end.

The end of the slide finger adjacent the slot 192 is curved to fit the inside contour of the separator disc rim 132 and is further formed with a projecting ledge 195 which, when the slide is moved toward the stack of covers, moves under the forward edge of the lowermost cover in the stack. This ledge when the slide finger is in, supports the stack, this being in addition to the support of the disc rim 132, and prevents feeding when the recess 151 passes under the cover.

Movement of the slide finger is controlled by an electric solenoid 197 (Fig. 5) having lead wires 198, 199 which form a physical part of the electric circuits hereinbefore briefly mentioned. The solenoid is housed in an open end casing 201 which is bolted over the top of and in communication with an upper compartment 202 of a switch housing 203. This housing is secured to the side of the casing 130.

An improperly filled can effects the de-energization of the solenoid 197 which causes a core 205 movable therein to drop, whereupon a latch member 206 (see also Fig. 6) with which it is connected, also drops. One end of this latch member is pivoted on a stud 211 carried in lugs 212 formed in a side wall of the housing 203, and located inside the upper compartment 202. The other end of the latch member is formed in an upright hook 214 which normally engages with and holds a depending hook 215 formed on the end of a slidable latch bar 216. The latch bar is carried in a slot 217 formed in a side wall of the housing 203.

The outer end of the latch bar 216 is pivotally connected to the bifurcated end of a lever arm 221 of a three arm bell crank 222. This crank is mounted on a pivot shaft 223 carried in the ends of bracket arms 224 formed on the casing 130. A second arm 226 (Fig. 6) of the crank is connected to one end of a link 227. The opposite end of this link pivotally joins a bent lever 228 which is mounted on a vertical shaft 229 carried in suitable bearings formed in the housing 130 and cover plate 138.

At its top the shaft 229 also carries a lever 234 one end of which is connected to the rear end of the cover slide finger 191. It is this shaft and these levers that are rocked when the latch members 206, 216 are disconnected and it is then that the slide-finger 191 moves into stack supporting position so as to prevent the release of a cover.

This rocking movement is effected by an expansion spring 235 (Fig. 6) one end of which is retained in a hollow nut 236 threaded in a lug 237 formed on the side of the housing 203. The opposite end of the spring is located in a hollow spring barrel 238 slidably mounted in a bore 239 in the lug 237. The closed end of this spring barrel under pressure of the spring engages the end of a lever arm 241 of the bent lever 228 and rocks the shaft 229 when the latch members are disconnected.

The slide finger 191 stays in stack supporting position for a cycle of operation following its movement there until the stack can again be supported by the separator disc rim 132. This timed holding of the finger is effected by a cam track 245 (Figs. 1, 5, 6 and 14) which is formed in a face of the cam 65, the cam track operating against a cam roller 246 carried on the free end of a third lever arm 247 of the bell crank 222.

The cam track 245 is shaped to shift the crank 222 and parts connected thereto against the resistance of the spring 235 and when the spring is brought under compression the latch member 216 slides into latching engagement with the member 206. Thus if a properly filled can follows one improperly filled, the latch members will reengage and a cover will be fed for that properly filled can. Conversely if two improperly filled cans pass, the latch members will not latch for the second can and the slide finger will be again moved into position to prevent the release of a cover.

Can throw-out mechanism

When a properly filled can is moved into its turret pocket 81 it passes below its cover, which is held on the ring 182 as hereinbefore described. The turret conveys both can and cover forward simultaneously. The can, still supported on the table 21, is held in the turret pocket and guided in its curved track by an outer guide formed by guide rails 251, 252 (Figs. 1, 16 and 17) which are spaced apart end for end and are secured to the top of the table. A movable guide arm or can switch 253 spans the space between the stationary rails and retains the properly filled can in its path as it passes a discharge disc 254, which will be fully described hereinafter.

Figure 1:
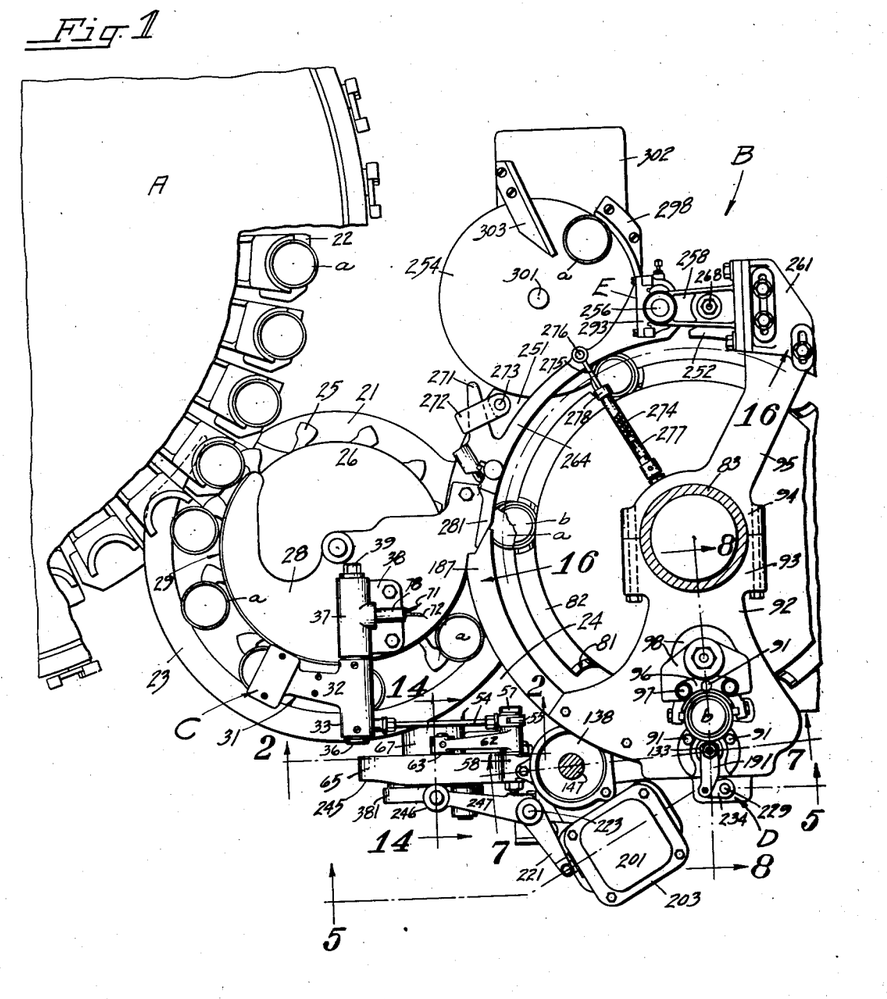
Figure 1 is a top plan view of a can and cover feeding mechanism embodying the instant invention, with parts broken away.
Figures 2, 3, 4:
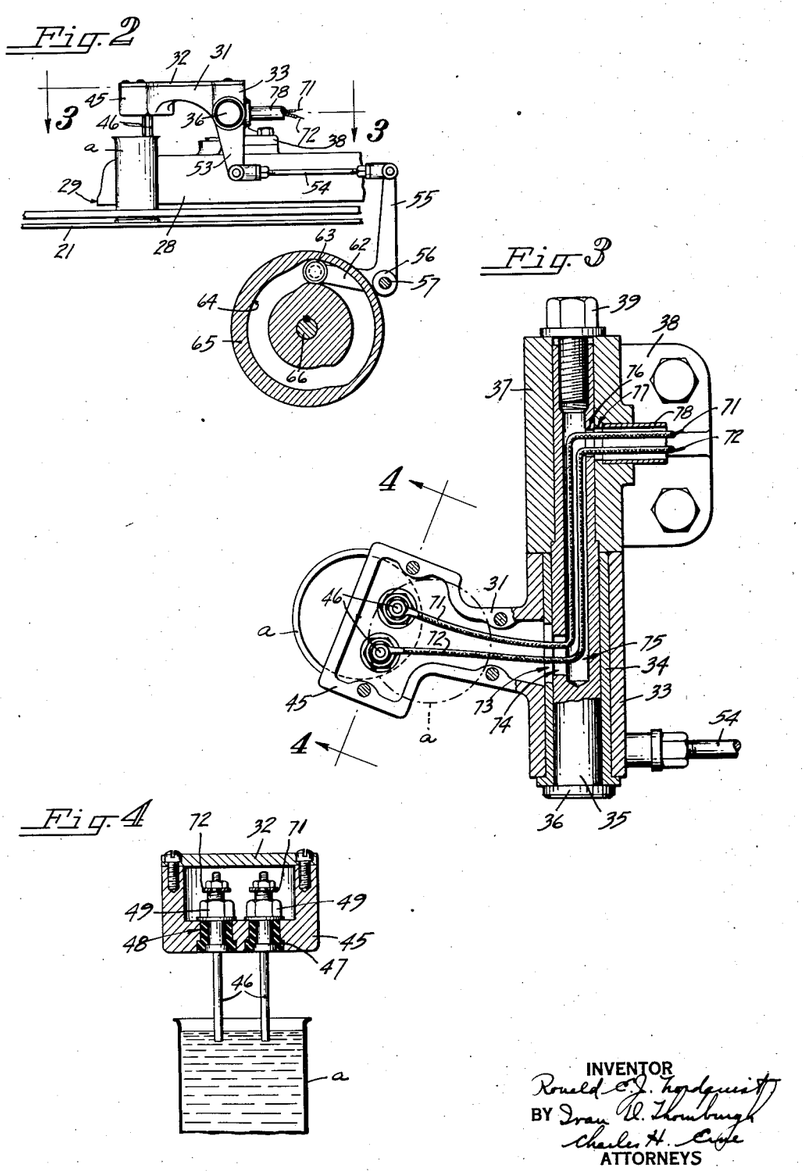
Fig. 2 is a vertical section of a fragmentary part of the mechanism as taken substantially along the section line 2—2 in Fig. 1.
Fig. 3 is an enlarged horizontal section, on two levels, viewed substantially along the line 3—3 in Fig. 2.
Fig. 4 is a vertical section taken substantially along the line 4—4 in Fig. 3.

The movable switch arm 253 is mounted on the lower end of a vertical shaft 256 (see also Fig. 15) which is carried at its upper end in a bearing 257 of a bracket 258. (Figs. 1 and 16.) Said arm is normally urged inward by a rod 275 actuated by a spring 274 as will be later described. A collar 259 secured to the top of the shaft holds it in the bearing. The bracket 258 is bolted to the side of an angle plate 261 which in turn is adjustably bolted to the top of the auxiliary bracket 95.

The cover moves in vertical alignment with and above the can and is guided in a groove 263 of a yieldable cover guide or trip rail 264 (Figs. 1, 5, 16 and 17). At one end this trip rail is formed with a vertically disposed hub 265 by which it is supported. A clearance slot 266 is provided in the trip rail at this end through which the shaft 256 extends. The hub 265 is mounted on a shouldered pivot stud 268 which at its upper end is held in the bracket 258 by a nut 269 threadedly engaging a reduced top end of the stud. At its lower end the stud is formed with an enlarged head 270 which holds the hub and rail against vertical displacement.

At its forward end, the guide trip rail 264 is vertically supported by engagement of an integrally formed horizontal arm 271 (Figs. 1 and 15) between upper and lower prongs of a bracket 272. This bracket is mounted on a fixed vertical rod 273 which is carried in the can guide rail 251.

Figures 15, 17, 18:
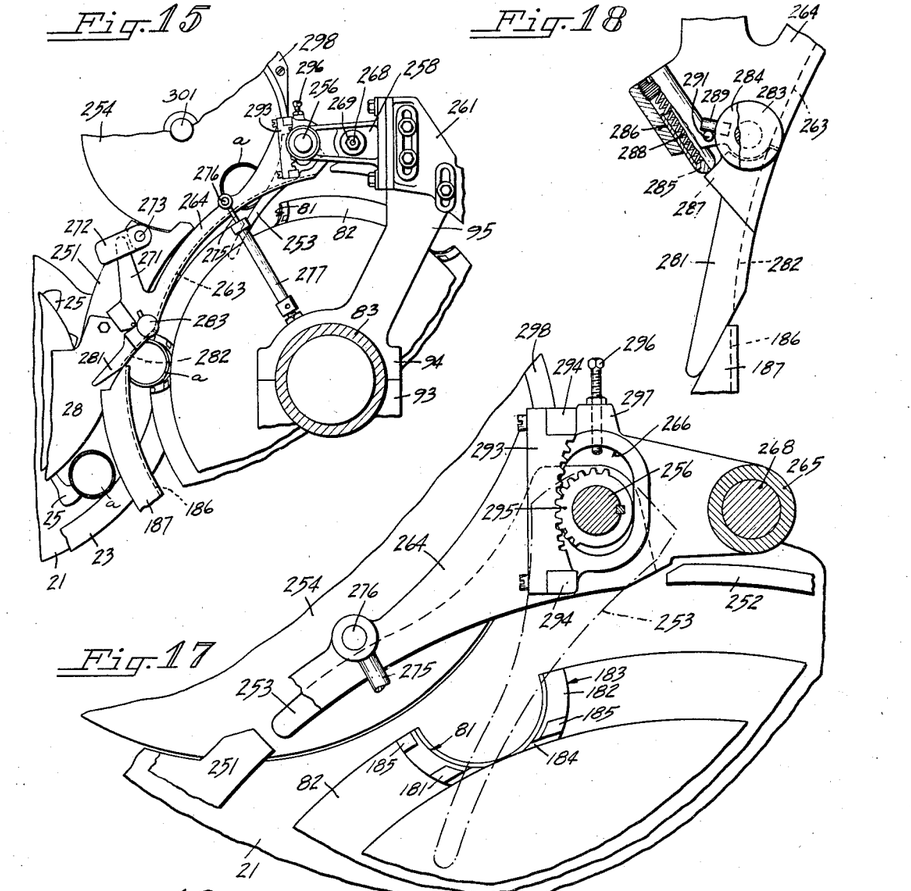
Fig. 15 is an enlarged fragmentary top plan view of the can throw-out device illustrated in Fig. 1.
Fig. 17 is an enlarged fragmentary horizontal section taken substantially along the broken line 17—17 in Fig. 16.
Fig. 18 is an enlarged fragmentary horizontal view of a detail of the can throw-out device, with parts broken away.
Figure 16:
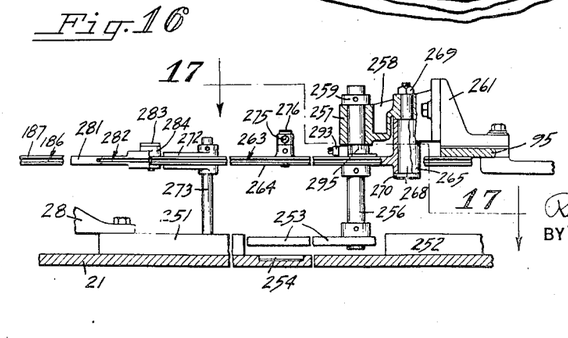
Fig. 16 is an enlarged sectional view taken substantially along the curved line 16—16 in Fig. 1, with parts broken away.

The guide trip rail 264 is continuously urged into an inner position as in Fig. 15, or the trip rail is pressed in toward the cover in the turret pocket when a cover is passing as in Fig. 1. This urging action is the effect of a coil expansion spring 274 which encircles a headed rod 275 one end of which is secured to the trip rail by a headed pivot pin 276 (see also Fig. 16).

The spring and the headed end of the rod are housed in a cylinder 277 having a perforated cap 278 at one end through which the rod extends. The cap holds the spring under compression against the headed end of the rod within the cylinder. The opposite end of the cylinder is pivotally secured in any suitable manner to the hub 84 of the bracket 95.

The forward end of the guide rail 264 carries a yieldable toe rail 281 having a cover guiding groove 282. One end of the toe slidably engages against the stationary guide rail 187. This presents a flexible connection between the movable rail 264 and the stationary rail 187 and provides a continuous guide track for the cover in its passage from the groove 186 to the groove 263 and facilitates such a passage.

The toe 281 is connected to the end of the rail 264 by a headed pivot pin 283 which extends through a boss 284 formed on the toe. The lower end of the pin is secured in the rail 264 (see also Fig. 18). A spring barrel 285 is located in a bore 286 formed in the end of the guide rail and is urged against a ledge 287 of the toe by a coil spring 288 within the spring barrel. Thus the pressure of the spring keeps the end of the toe in engagement with the end of the stationary rail. A horizontal pin 289 secured in the side of the toe hub 284 is adapted to engage against a vertical stop pin 291 held in the rail, and this limits the yielding movement of the toe and prevents the spring 288 from pushing the barrel out of its bore. When in stopped position (Fig. 18) the grooves 186, 282 and 263 form a continuous curved path.

When there is no cover in a turret pocket 81 passing adjacent the guide rail 264, as when an improperly filled can in the pocket has failed to release a cover, the expansion spring 274 pulls toward the rod 275 and holds the rail in toward the turret as in Fig. 15. Movement of the guide rail into this position is accompanied by a similar shifting of the movable can guide arm 253 (see also the broken line position of arm 253 in Fig. 17).

A curved rack 293 (Figs. 16 and 17) is bolted to lugs 294 which extend up from the top of the rail adjacent the clearance slot 266. The rack meshes with teeth of a segmental pinion 295 which is keyed to the shaft 256. An adjustable set screw 296 threadedly engaged in a boss 297 of the rail 264 extends into the clearance slot 266 and provides a stop to limit the inward swing of the guide rail.

When the can guide switch arm 253 is in and across the path of travel of an advancing can carried in the turret pocket 81 (see dot and dash lines in Fig. 17) the can on striking the switch arm is deflected from the turret pocket onto the discharge disc 254. A curved guide rail 298 mounted adjacent thereto directs further travel of the deflected can.

The discharge disc 254 (Figs. 1 and 15) is mounted on a continuously rotating shaft 301 journaled in suitable bearings formed in a table 302 which is secured to the side of the machine main frame 24. Rotation of the disc carries the uncovered can along the rail 298 and into engagement with a deflector bar 303 which sweeps the can off the disc onto the table from which it may be disposed of in any suitable manner. The deflector bar 303 and curved guide rail 298 are secured to the top of this table.

When a properly filled can is delivered into a turret pocket 81 and a cover discharged from the stack as already described is in place thereabove, the cover engages against the hinged toe 281 and pushes out the cover guide rail 264, holding it out as shown in Fig. 1 as the can and cover are further advanced. This action moves the can guide arm 253 into the space between the can guide rails 251, 252 and out of the path of the can and prevents its discharge by way of the discharge disc. Thus can and cover are carried forward into other parts of the machine which form no part of this invention. These parts include devices for securing the cover to the can as in a double seamer or the like.

Electric control devices

Figure 19:
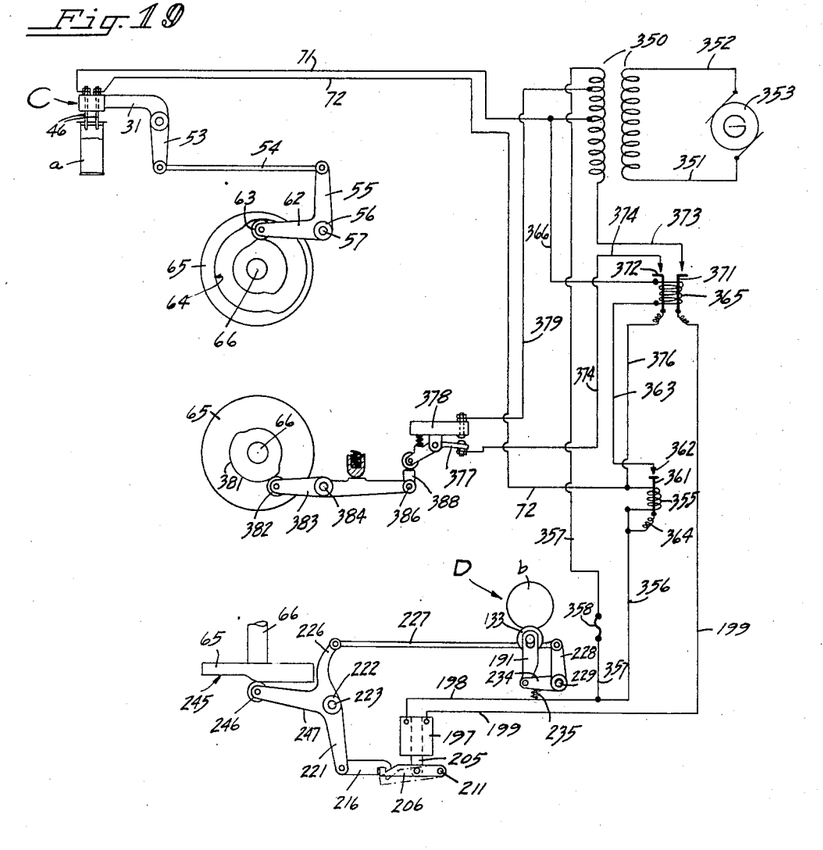
Fig. 19 is a wiring diagram of the electric control devices associated with the mechanism.

The electric control circuits which include the electrodes 46 and which function in feeding or releasing can covers b from the cover feed device D when the test indicates filled cans a will now be considered and reference should be had to the wiring diagram of Fig. 19. There are four interconnected control electric circuits which receive electric energy from a suitable source as through the secondary of a transformer 350 which may be connected on the primary side by service wires 351, 352 to a generator 353.

The first of these circuits may be considered the testing circuit and includes the electrodes 46 and their wires 71, 72. The wire 71 is tapped into the secondary winding of the transformer 350. Wire 72 is connected to one end of a testing solenoid relay 355 the opposite end of which is connected to a wire 356. This latter wire is connected to a return wire 357 which leads into the secondary winding of the transformer 350. This return wire 357 preferably includes a safety fuse 358.

When the electrodes 46 are dipped down into a properly filled can, and the liquid completes the testing circuit, the testing solenoid relay 355 is energized. This establishes a second or auxiliary testing circuit.

Energizing of the solenoid relay 355 shifts a core 361 centrally disposed therein and the core electrically connects with a terminal contact 362 of a wire 363. The lower end of the core 361 is connected by a wire 364 to the wire 356. The wire 363 joins with the winding of an auxiliary solenoid relay 365. The other end of the solenoid winding is connected by a wire 366 to the wire 71. In this auxiliary testing circuit electric energy passes from the transformer through wire 366, through solenoid 365, wire 363, terminal contact 362, core 361, wires 364, 356, 357 including fuse 358, back into the transformer. This energizes the auxiliary solenoid 365 and establishes a third or cover feed control circuit.

Energization of the auxiliary solenoid 365 actuates a movable double core 371, 372 which closes two gaps, one between the core 371 and a terminal contact of a wire 373, the other between the core 372 and a terminal contact of a wire 374. The wire 373 is tapped into the secondary winding of the transformer 350. The solenoid core 371 is directly connected with the wire 199 leading into the solenoid 197. The other wire 198 of the cover feed solenoid connects with the wire 357.

When the cover feed control circuit is complete, current from the transformer passes through the testing circuit along wire 373, core 371 of the auxiliary solenoid 365, wire 199, cover feed solenoid 197, thence back to the transformer along wires 198, 357 including the fuse 358. This current energizes the cover feed solenoid 197 and keeps the slide finger 191 withdrawn which, as hereinbefore explained, permits the release and feeding of covers.

The fourth circuit will be termed a holding circuit since it is provided to prevent constant shifting of the slide finger with each testing cycle and to maintain the cover feed solenoid 197 energized as long as properly filled cans are continuously passing through the machine. This holding circuit includes the core 372 of the auxiliary solenoid 365 and when this solenoid shifts its double core the parts are set to establish the holding circuit as soon as a mechanically operated switch is closed as will now be explained.

The lower end of the core 372 is connected by a wire 376 to the testing circuit wire 72. The wire 374 connects with a movable terminal element 377 of a cam actuated switch 378 disposed in a lower compartment 370 of the housing 203 (see Fig. 5 for relative location of this switch). The opposite terminal of switch 378 is connected to a wire 379 which is tapped into the secondary windings of the transformer 350. Thus when the switch 378 is closed the other parts of the circuit being set as just described current from the transformer passes along wire 379, through switch 378, wire 374, core 372, wire 376, through the testing solenoid 355, wires 356, 357 including the fuse 358 back to the transformer. The switch 378 is closed only when the electrodes 46 are out of a can as when being lifted from, or inserted into a can.

Figure 5:
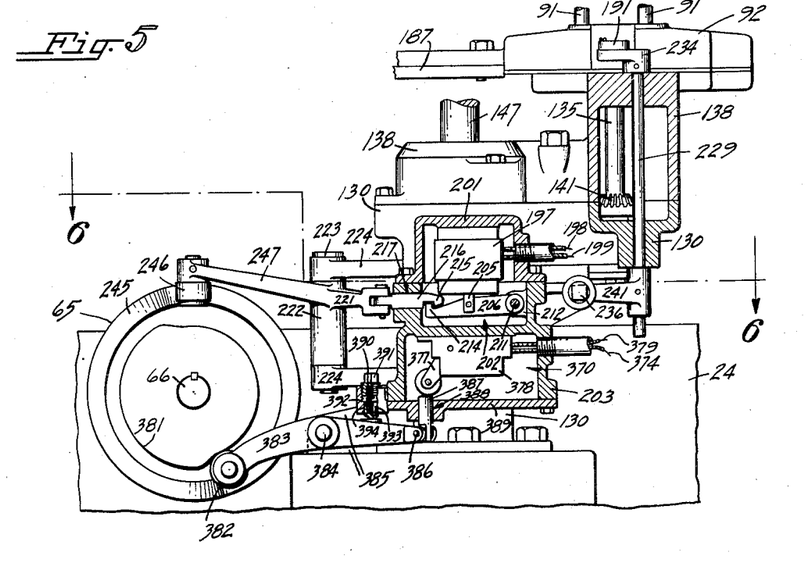
Fig. 5 is an enlarged vertical section taken substantially along the broken line 5—5 in Fig. 1, parts broken away.
Figure 14:
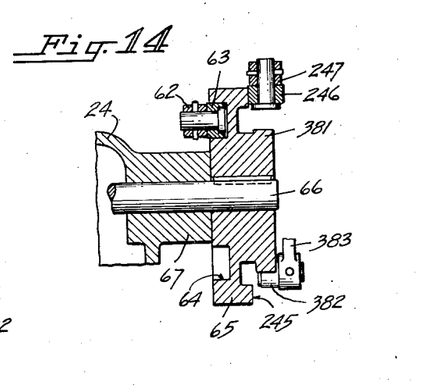
Fig. 14 is an enlarged fragmentary section taken substantially along the line 14—14 in Fig. 1.

Switch 378 is opened and closed mechanically and reference should now be had to Figs. 5, 6 and 14 which show an edge cam 381 which constitutes the actuating, timed element for this purpose. The cam 381 is formed as a part of the cam 65 and is engaged by a roller 382 which is carried on one end of a lever 383. The lever is mounted intermediate its ends on a pivot stud 384 carried in a boss 385 formed on the side of the casing 130.

The opposite end of the lever 383 is bifurcated and carries a pivot pin 386 which extends through the lower end of a vertical slide pin 387. The latter slides in a bore 388 formed in a cover plate 389 which is bolted over and closes the bottom of the lower compartment 370 of the casing 130. The upper end of the pin 387 extends into this compartment and engages the movable element 377 of the switch 378 which is housed therein.

The cam roller 382 is kept against its cam track by means of an expansion spring 390 one end of which is retained in a hollow nut 391 threaded in a lug 392 formed on the cover plate 389. The opposite end of the spring is located in a hollow spring barrel 393 slidably mounted in a bore 394 in the lug 392. The closed end of the spring barrel, under pressure of the spring, engages the lever 383 and holds the cam roller 382 in place.

The contour of the cam is such as to close the switch 378 just before the electrodes 46 are lifted out of the liquid of a properly filled can and to open the switch again just after the electrodes have been inserted into the next can. The cover feed solenoid is maintained energized as long as properly filled cans continue to pass through the machine, the liquid in each of these cans acting to maintain the cover feed solenoid energized during the small time that the switch is open.

When an improperly filled can is encountered there is a failure of liquid connection between the electrodes and when the switch 378 is opened on its next actuation by the cam, the circuit is broken, the cover feed solenoid is de-energized and the spring 235 snaps the slide finger 191 in and stops the feeding of a cover. As soon as the next properly filled can comes along the circuits are again established and the cover feed solenoid is again energized and will then remain so until the next improperly filled can opens the testing circuit.

Since all solenoids are energized for proper can feeding a failure of current from the main source would automatically de-energize the solenoids and this would prevent the feeding of covers to cans which under such circumstances could not be tested. This is an additional safety feature.

It will be seen from the foregoing description that my invention comprises a continuously-operating mechanical cover-feeding means chiefly comprising the slide 112, the separator disk 134 and the fingers 164.

Also an independent mechanical means, which when acting positively, prevents the feeding of covers. This means consists mainly of element 191 which is mechanically reciprocable by elements 22 and 65.

Also another mechanical device which, when positively actuated, prevents the functioning of the element 191, or means for preventing the cover feeding. This device consists mainly of elements 206 and 224.

Also electrical circuits which, when closed by the liquid in a sufficiently filled container, positively actuate the latch member 286.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine of the character described, the combination of means for conveying filled containers, an electric circuit closed by the contents of sufficiently filled containers, cover feeding devices controlled by said electric means, means for applying the fed covers to said cans, and means controlled by the fed covers for directing filled containers to a closing station.

2. In a machine for treating liquid filled containers, the combination of means for testing the liquid level therein, devices for conveying said containers to said testing means, cover feeding means for feeding covers to said containers and operative to feed covers only to sufficiently filled containers, devices for conveying said containers after testing, and a throw-out mechanism operative in the absence of a cover on each insufficiently filled container for diverting such insufficiently filled containers from said conveying devices.

3. In a machine for treating liquid filled containers, the combination of means for testing the liquid fill therein to determine if the liquid reaches a predetermined filled level and for thereby detecting an insufficiently filled container, devices for conveying said containers after testing, cover feeding means operative to feed covers only to containers filled to said predetermined level, and a throw-out mechanism operative in the absence of covers on said insufficiently filled containers to divert from said conveying devices such insufficiently filled containers.

4. In a machine for treating liquid filled containers, the combination of a conveyor for moving said containers, movable electric testing elements arranged above said conveyor, instrumentalities for inserting said testing elements into each container as it passes thereunder for testing its liquid level and thereby permitting the flow of electric current when a container is sufficiently filled, means for normally feeding covers to said containers, electric controls in circuit with said testing elements and operable when an insufficiently filled container is detected by said testing elements to prevent feeding of a cover to such container, and a throw-out mechanism operable when a cover is absent on a container for diverting such container from the machine.

5. In a machine for treating liquid filled containers, the combination of means including an electrical circuit for detecting the presence of insufficiently filled containers, cover feed devices, and means controlled by said electrical circuit and cooperating with said cover feed devices for rendering the latter ineffective when an insufficiently filled container is detected.

6. In a machine for treating liquid filled containers, the combination of means including an electrical circuit for detecting the presence of insufficiently filled containers, cover feed devices for feeding covers to said containers, and means controlled by said electrical circuit for stopping the feeding of covers from said cover feed devices when the fill test of said containers is performed on an insufficiently filled container.

7. In a machine for treating liquid filled containers, the combination of electrodes adapted for insertion into a said container for detecting insufficiently filled containers, electrical means operable during the flow of electric energy between said electrodes and by way of the intervening liquid in a sufficiently filled container, cover feed devices for feeding covers to sufficiently filled containers, and means governed by said electrical means for withholding covers from insufficiently filled containers.

8. In a machine for treating liquid filled containers, the combination of means for detecting insufficiently filled containers, cover feed devices, means controlled by an electric circuit through said detecting means and cooperating with said cover feed devices for rendering the latter ineffective when an insufficiently filled container is detected, devices for conveying filled containers to and from said detecting means, and means operative in the absence of a cover on an insufficiently filled container for diverting said insufficiently filled coverless container as determined by said detecting means from the machine.

9. In a machine for treating liquid filled containers, the combination of means for detecting insufficiently filled containers, cover feed devices, means controlled by an electric circuit through said detecting means for governing the feeding of covers from said cover feeding devices in accordance with the fill of the containers, devices for conveying filled containers to and from said detecting means, and means for diverting containers from the machine when no covers are fed to them.

10. In a can machine, the combination of means for detecting insufficiently filled containers, cover feed devices, means controlled by said detecting means and cooperating with said cover feed devices for rendering the latter ineffective when an insufficiently filled container is detected, a throw-out mechanism for diverting insufficiently filled containers from the machine without a cover, devices for conveying filled containers to and from said detecting means, and instrumentalities cooperating with said throw-out mechanism and operable by a cover fed when a substantially filled container is detected for rendering said throw-out mechanism ineffective.

11. In a machine for treating liquid filled containers, the combination of a conveyor for moving said containers in a continuous procession, movable elements arranged above the path of travel of said containers and insertable therein for detecting insufficiently filled containers, cover separator devices for releasing covers from a magazine, means for receiving said released covers and for transferring them into axial alignment above said containers, and means controlled by said detecting elements and cooperating with said cover separator devices for rendering the latter ineffective when an insufficiently filled container is detected.

12. In a machine for treating liquid filled containers, the combination of a conveyor for moving said containers in a continuous procession, elements insertable into each container for detecting insufficiently filled containers, cover feed devices, means controlled by said detecting elements and cooperating with said cover feed devices for rendering the latter ineffective when an insufficiently filled container is detected, and means cooperating with said feeding controls for effecting continuous operation of said cover feed devices when sufficiently filled containers are successively detected by said detecting elements.

13. In a machine for treating liquid filled containers, the combination of elements for detecting insufficiently filled containers, a cover magazine for holding covers in stacked formation, cover separating devices for individually removing covers from the stack, instrumentalities associated with said cover separating devices for holding said covers at times against separation from the stack, and means controlled by said detecting elements and cooperating with said instrumentalities for causing the latter to withhold covers from insufficiently filled containers.

14. In a machine for treating liquid filled containers, the combination of a conveyor for said containers, movable elements insertable in a container for detecting insufficiently filled containers, a turret moving in time with said conveyor and having a pocket for receiving a tested container, cover separator devices, means controlled by an electric circuit through said detecting elements and cooperating with said cover separator devices for releasing a cover in accordance with the fill of said container, and means associated with said turret for receiving and carrying said released cover above and in axial alignment with said turret pocket.

15. In a machine for treating liquid filled containers, the combination of a conveyor for said containers, movable electrodes disposed in the path of travel of said conveyor and insertable into containers for detecting insufficiently filled containers, cover feed devices for feeding covers to sufficiently filled containers, means controlled by the flow of electric energy between said electrodes while inserted in said containers for governing the feeding of covers by said cover feed devices in accordance with the fill of said containers, and means operative by the absence of a cover on a container for diverting said insufficiently filled containers from the machine.

16. In a machine for treating liquid filled containers, the combination of means for testing the liquid level therein and for thereby detecting an insufficiently filled container, devices for conveying said containers to said testing means, means for normally supplying covers to said containers and controlled by said testing means to prevent the application of a cover to an insufficiently filled container, devices for conveying said containers after testing, and a throw-out mechanism cooperating with said cover supply means and operative by the absence of a cover on an insufficiently filled container for diverting such insufficiently filled containers from said machine.

17. In a machine of the character described, the combination of means for feeding filled containers to a closing station, electrodes and means for inserting them into the containers successively as the latter are fed to detect the presence of an insufficiently filled container, cover feeding means for said containers, and means controlled by failure of electric current through said electrodes and container contents for preventing the feeding of covers to insufficiently filled containers, and means operative by the absence of a cover on an insufficiently filled container for diverting such insufficiently filled container from said feeding means.

18. In a machine for treating liquid filled containers and having a discharge unit associated therewith for receiving insufficiently filled containers, the combination of means for testing the liquid level in said containers and detecting an insufficiently filled container, devices for conveying filled containers to said testing means, means for normally feeding covers to said containers, devices for conveying filled containers after testing, a throw-out mechanism operative in the absence of a cover on a tested insufficiently filled container for diverting such insufficiently filled container into said discharge unit.

19. In a machine for treating filled containers and having a discharge unit associated therewith for receiving insufficiently filled containers, the combination of means for detecting insufficiently filled containers, cover feed devices, means controlled by an electric circuit through said detecting means and cooperating with said cover feed devices for rendering the latter ineffective when an insufficiently filled container is detected, devices for conveying filled containers to and from said detecting means, and throw-out mechanism operative in the absence of a cover on an insufficiently filled container for diverting from the machine into said discharge unit such insufficiently filled coverless container.

RONALD E. J. NORDQUIST.